June 16, 1953 — L. TWIST — 2,642,489
VEHICLE DIRECTION SIGNAL
Filed March 6, 1950 — 3 Sheets-Sheet 1
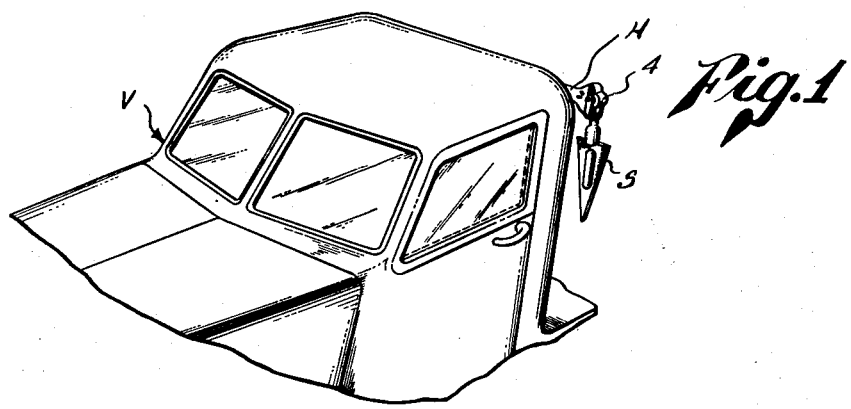
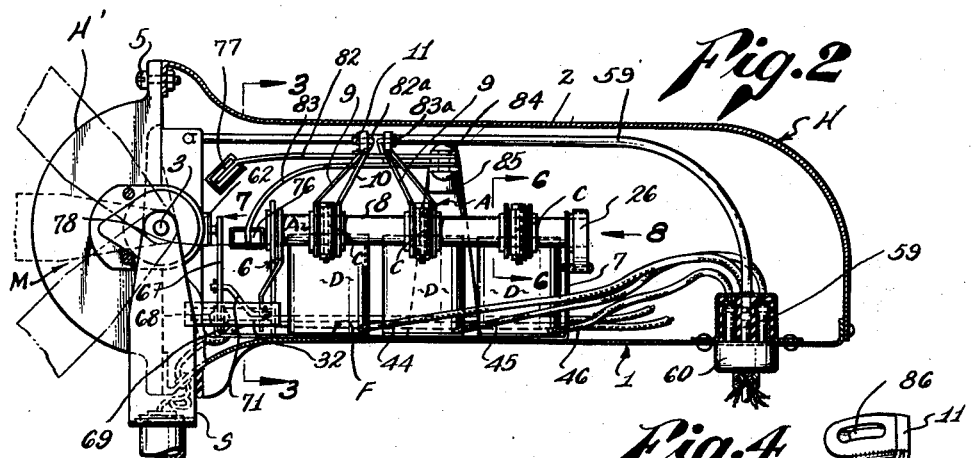
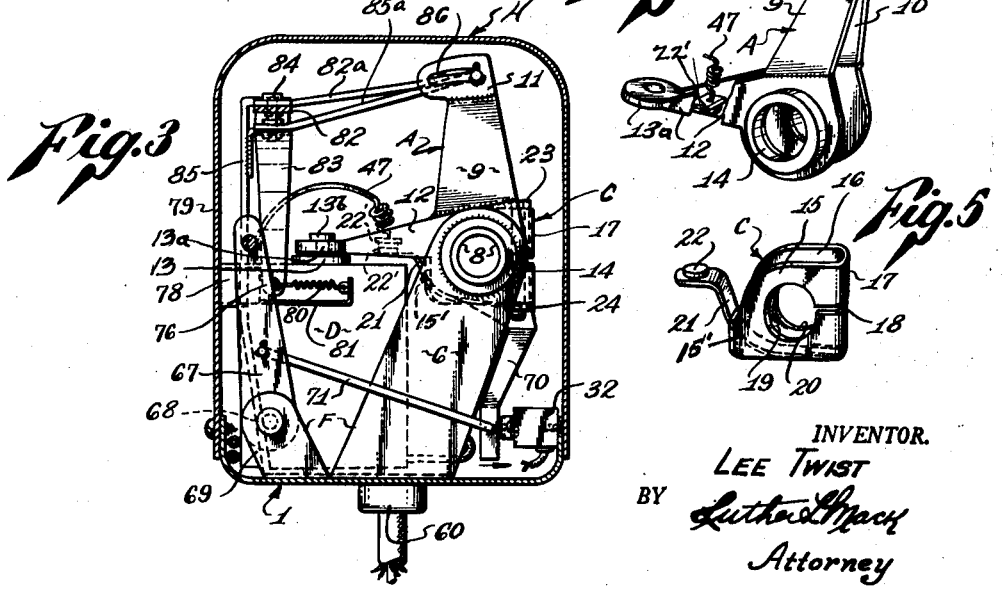
INVENTOR.
LEE TWIST
BY Luther L. Mack
Attorney June 16, 1953 L. TWIST 2,642,489
VEHICLE DIRECTION SIGNAL
Filed March 6, 1950 3 Sheets-Sheet 2
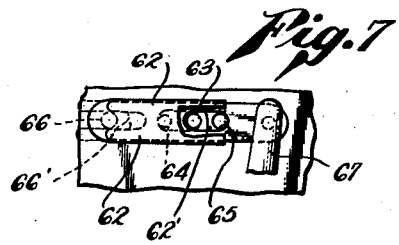
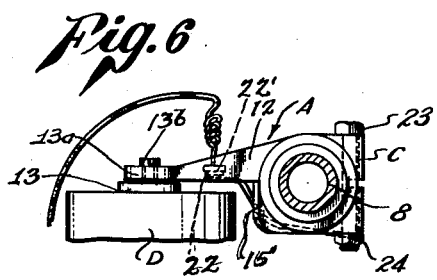
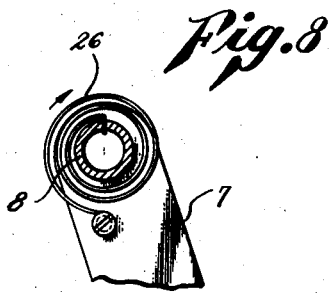
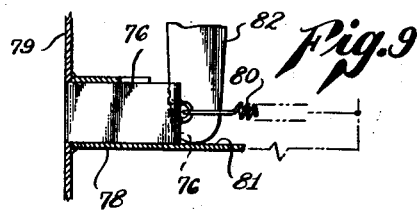
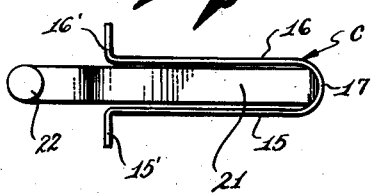
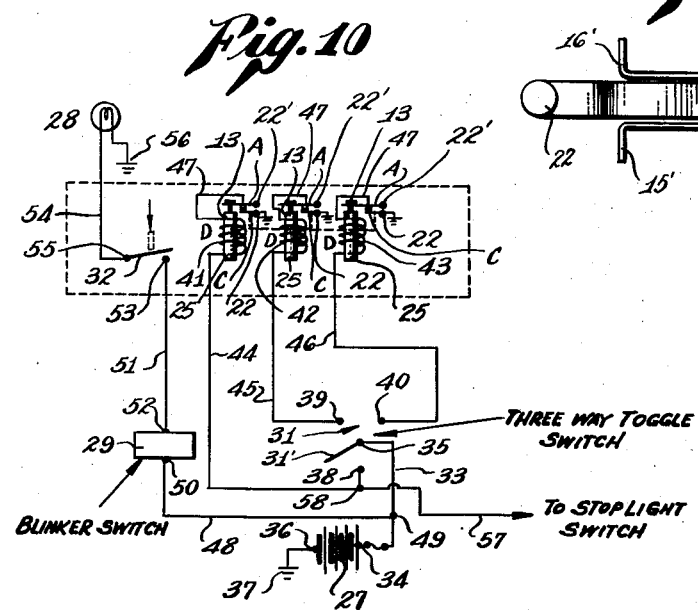
INVENTOR.
LEE TWIST
BY Luther L Mack
Attorney June 16, 1953 L. TWIST 2,642,489
VEHICLE DIRECTION SIGNAL Filed March 6, 1950 3 Sheets-Sheet 3

INVENTOR.
LEE TWIST
BY Luther L. Mack
Attorney

Patented June 16, 1953

2,642,489

UNITED STATES PATENT OFFICE 2,642,489

VEHICLE DIRECTION SIGNAL

Lee Twist, Huntington Park, Calif.

Application March 6, 1950, Serial No. 147,800

7 Claims. (Cl. 340—128)

This invention relates to and has for an object the provision of an improved direction indicator for vehicles adapted to be operated manually for applying energy from a source of vacuum and electricity to a suitable signal arm, mounted preferably but not necessarily at the rear end of a vehicle for indicating proposed right and left turns and the slowing or stopping of a vehicle.

To such end it is an object to employ a conventional vacuum motor connected with the intake manifold of a vehicle engine so as to raise and lower the signal arm to positions for indicating the intention of the vehicle operator to slow or stop, or turn right or left, and an electrical circuit including means for instituting and controlling the movement of the signal arm.

A vacuum motor such as is employed in connection with conventional windshield wipers will usually suffice for my purpose and will occasion the swinging of the signal arm from a lowermost position at which said arm will indicate a proposed slowing down or stopping of the vehicle to an uppermost position for indicating a proposed right turn, and an intermediate horizontal position usually indicating a proposed left turn of the vehicle. It is an object, therefore, to provide a stop for at least two signalling positions which is electrically actuated for extension into engagement with the signal arm for arresting the swing of said arm at a point corresponding to the proposed change in operation of the vehicle and including desired mechanical and electrical elements and interconnections therebetween, in order that the manual operation of a single switch will effect a desired signalling operation and upon return of said switch to normally neutral position all elements of the system will be restored to non-signalling conditions in readiness for a succeeding operation.

Other and more detailed objects will appear as the description of my improvements progresses.

I have shown a preferred form of my direction indicator in the accompanying drawings, subject to modification, within the scope of the appended claims, without departing from the spirit of the invention. In said drawings:

Fig. 1 is a perspective view of my direction signal mounted on a vehicle;

Fig. 2 is a longitudinal sectional view of the signal housing and arm showing a suitable arrangement of mechanical and electrical elements of the system and connections therebetween and with the signal arm;

Fig. 3 is a transverse sectional view of the same on line 3—3 of Fig. 2;

Fig. 4 is a perspective view of one element of each of three similar actuating units each unit bearing make and break contacts, which are independently operable for effecting movement of the signal arm to different positions;

Fig. 5 is a perspective view of a second element of each of the actuating units, all of which are commonly operated and cooperate with the elements of Fig. 4 for opening and closing the signal circuit;

Fig. 6 is a cross sectional view of the mechanism on line 6—6 of Fig. 2 showing one of the actuating units and an associated solenoid;

Fig. 7 is a rear view of the vacuum motor, valve and operating arm therefor as seen in the direction of arrow 7 of Fig. 2;

Fig. 8 is a sectional view of an end of the operating shaft which carries the actuating units of Figs. 4 and 5, and as seen in the direction of arrow 8 of Fig. 2;

Fig. 9 is a fragmentary section of a part of the signal arm arresting mechanism of Figs. 2 and 3;

Fig. 10 is a circuit diagram showing the electrical signalling elements and connections;

Fig. 10a is a top plan view of one element of an actuating unit;

Figure 11:
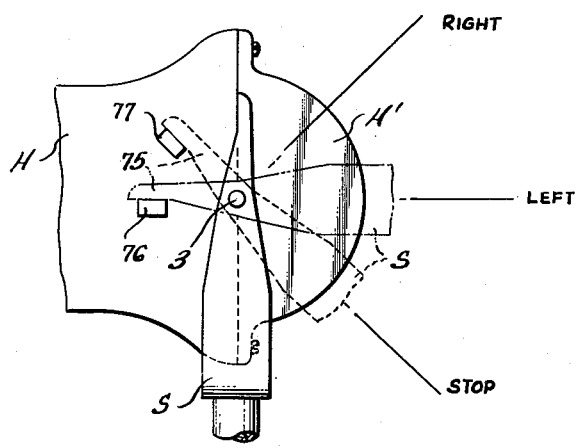
Fig. 11 is a fragmentary view of the signal arm and motor showing different positions of the arm and arresting means.

Briefly described, my direction signal includes a housing H formed of preferably detachable members 1 and 2 adapted for attachment to or near the top of a vehicle V for enclosing the operating mechanism and a pivoted signal arm S and a vacuum motor M having a shaft 3, said motor being enclosed at the inner end of the signal arm S in a housing H' affixed to the housing H as by means of screws 5.

Base 1 of housing H has a sheet metal frame F secured to the floor thereof and formed with spaced upturned portions 6 and 7 which provide bearing for rotatably supporting a hollow shaft 8 on which a plurality of actuating units including the actuators A (Fig. 4) are loosely held in spaced positions and associated contact elements C (Fig. 5) are tightly affixed as and for the purpose hereinafter described.

Actuators A are integrally formed with similar sides 9 and 10 joined at their upper ends by a bar 11. Arms 12 extend in the same direction from said sides and loosely support armatures 13 which are extended into solenoids D and are held on portions 13a as by screws 13b. The enlarged lower portions of sides 9 and 10 are coaxially bored and extended outwardly to form bearings 14 which rotatably receive shaft 8. Contact elements C are likewise integrally formed with spaced sides 15 and 16 which are joined by a web 17, but said sides are split at 18 to permit the clamping of said contact elements on shaft 8. Sides 15 and 16 are bored at 19 and 20, respectively to receive shaft 8 and are so spaced apart that they movably fit between sides 9 and 10 of actuators A when the elements A and C are mounted on shaft 8. Sides 15 and 16 are bent outwardly in opposite directions as at 15' and 16' (Fig. 10a) which underlie the sides 9 and 10 of arm 12 of actuator A. A contact finger 21 is bent and extended from web 17 of element C and is provided with a contact 22 adapted to register with and at times engage a contact 22' of the associated actuator A.

As shown in Fig. 6, contact elements C are clamped to shaft 8 by means of bolts 23 extended through the spaces between sides 15 and 16 of elements C adjacent webs 17 and held tight by nuts 24 so as to constrict the furcations of said elements and thereby affix the elements C to shaft 8, while actuators A are free to oscillate independently on said shaft.

Portions 15' and 16' of elements C operatively engage arms 12 of the actuators A for moving the actuators as shaft 8 is rotated when the respective solenoids are deenergized.

A solenoid D is mounted on frame F in association with each actuating unit and with its armature 13 movably disposed within its coil. Hence, each time a solenoid D is energized its armature 13 will be actuated and that particular actuator swung on shaft 8 to an extent which will swing elements C and shaft 8 by reason of the engagement of arms 12 with portions 15' and 16' of elements C and thereby occasion the operation of one unit by opening the valve of the vacuum motor to the vacuum line and consequently through the power of motor M swing signal arm S into a correspondingly appropriate position for affording a desired signal, as hereinafter described in detail.

The three actuating units A on shaft 8 are similar but independently operative while shaft 8 is normally stationary in a position at which the contacts 22 on elements C will be engaged with contacts 22' of actuators A. But when any one of the actuators A is swung downwardly on shaft 8 by pull of the associated solenoid core 25, the shaft 8 and all the elements C will swing in the same direction as the actuators A against the tension of a spiral spring 26 which is anchored at its opposite ends to shaft 8 and endmost bearing arm 7 of frame F and serves to hold shaft 8 and elements C in normal positions. As actuators A swing downwardly in a counterclockwise direction as shown in Fig. 3, arms 12 will engage portions 15' and 16' of elements C and thereby rotate elements C and shaft 8 correspondingly. Upon the deenergization of any actuating solenoid D and relief of pressure from an actuator A, the spring 26 will restore shaft 8 and all elements C to normal positions as the operated actuator is restored to position out of contact therewith.

Referring to the circuit diagram of Fig. 10 it will be observed that elements A and C and solenoids D receive energy from a battery 27 either directly as shown or indirectly from any point in the electrical system of a vehicle to which my signal may be applied. Preferably the circuit of Fig. 10 is arranged to include a main lamp 28 and a blinker switch, a main switch 31 of the multiple contact toggle type and a secondary automatically operated main light switch 32 mounted on frame F.

To such end a wire 33 leads from a battery terminal 34 to a terminal 35 of switch 31 while the other battery terminal 36 is grounded at 37. Switch 31 has three output terminals 38, 39 and 40, which are respectively connected with the coils 41, 42 and 43 of the three solenoids D, D and D by wires 44, 45 and 46. Coils 41, 42 and 43 are similarly connected with the contacts 22', 22' and 22' in each case as by similar wires 27, 47, 47. When the system is at rest the contacts 22 and 22' of all actuating units are grounded through actuators A and elements C by way of shaft 8 and frame F. The toggle arm 31' of switch 31, of course, swings selectively between contacts 38, 39 and 40 for selectively closing the control circuits of the different solenoids D and effecting different signalling operations.

Lamp 28 and switch 29 are series connected with battery 27 as by means of a wire 48 leading from a point 49 in wire 33 to a terminal 50 of switch 29; a wire 51 leading from a terminal 52 of switch 29 to a terminal 53 of a secondary switch 32; and a wire 54 connecting a terminal 55 of switch 32 with a terminal of lamp 28; while said lamp is grounded at 56, thus completing the circuit of lamp 28 and switch 29 when switch 32 is closed and that is only when the signal arm S is being operated or is operative for displaying any signal.

The electrical conductors, 44, 45, 46 and others together with a vacuum line 59 are introduced to housing H through a common connector 60, a wire 57 leading from terminal 58 to the stop light switch usually provided on a motor vehicle is so connected as to provide automatic movement of the signal arms for indicating a slowing or stopping of the vehicle. Thus no manual slow or stop signals are necessary.

Figure 12:
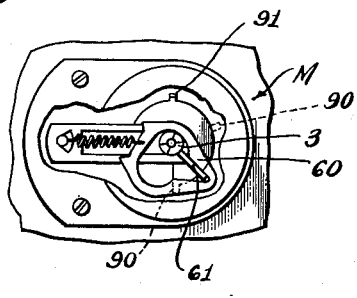
Fig. 12 is a view of the vacuum motor partly broken away to show the interior thereof.

The vacuum motor being of well known and conventional type needs no detailed description herein but is shown in the assembly of Fig. 2, and in Fig. 12, so as to reveal its chamber 60 and oscillator 61 on shaft 3, and in Fig. 7 with a slide valve 62 which is movable relative to an inlet port 63 and other ports, 64 and 65. Valve 62 is guided on pins 66 extended through elongated slots 66' and is moved by a lever 67 which is pivoted at 68 on an ear 69 of frame F. Valve 62 has an aperture 62' which affords communication selectively between port 63 and ports 64 and 65, and lever 67 are actuated by shaft 8 as it rocks in its bearings by means of an arm 70 fixed to and depending from said shaft and connected with lever 67 by a link 71 so that when each of the actuating units is operated by closing switch 31 vacuum may be applied through valve 62 to chamber 60 of the motor for moving oscilllator 61, shaft 3 and signal arm upwardly from a normally lowermost position as in Fig. 1 to a selected downwardly inclined horizontal or upwardly inclined position for respectively indicating a slow speed or stop, left turn or right turn as illustrated in Figs. 2 and 11. As shown in Fig. 3, switch 32 is located in housing H adjacent and adapted to be closed by arm 70 as it swings with shaft 8 and serves to close the circuit of lamp 28 at the beginning of each operation.

Movement of the signal arm S to a horizontal or downwardly inclined position is limited by means shown in Figs. 2, 3, 9 and 11, while, of course, the arm is held in lowermost position by gravity and by vacuum when in an upwardly inclined position while the oscillator 61 is held at the upper end of its stroke. Obviously, when switch 31 is opened all elements of the system are deenergized and the signal arm will drop to its lowermost or neutral position and will so remain until the institution of another signalling operation.

As viewed in Fig. 2, the leftward actuating unit is arranged for operating the signal arm for a left turn, the rightward unit for a right turn and the central unit for a slow or stop. Hence, only the leftward and central units are connected with a signal arresting means such as is shown in Fig. 9. It will be noted that signal arm S has a tail arm 75 which is adapted to be engaged and stopped by one of two stops 76 and 77 which are slidably held in guides 78, 78 extended inwardly in housing H from a wall 79. Stops 76 and 77 are urged inwardly by similar tension springs as at 80 (Fig. 9) having their outer ends affixed to the inner ends of the stops and their outer ends anchored to extensions 81 of guides 78. The actuators A of the left turn and stop actuating units are operatively connected with and are adapted to extend said stops through wall 79 into the path of signal extension 75 for arresting movement of arm S each time the solenoids D of such units occasions the swing of the actuators on shaft 8 in a counterclockwise direction. Such operations are accomplished by means of bars 82 and 83 which are pivotally supported at 84 on an upright bracket 85 of frame F. Bars 82 and 83 are connected by rods 82a and 83a, respectively, which are bent at their ends and extend through slots 86 of said two actuators A. This one actuator may move its bar, as at 82, without moving the bar 83 of the other actuator.

The bars 82 and 83 are bent at their left hands as viewed in Fig. 2 into positions of engagement with their respective stops 76 and 77, said stops being grooved at 75' to receive the edge of the associated bar, as at 82 in Fig. 9.

The vacuum motor M, as shown in Fig. 12, is conventionally arranged so that its oscillator blade 61 alternately swings in opposite directions as for reversing the movement of windshield wipers, but I modify the structure of the motor slightly by removing one of the stop ears as at 90 while retaining the other ear 91 and thereby render the motor unidirectional in effect, due to the necessity of only raising the signal area through power of the motor, while the arm is restored when the controls are returned to neutral. Otherwise, motor M is of conventional type.

All of the operating mechanism being mounted in housing H, the arm may be made of light weight material and its weight minimized to a point where the power of the motor is ample to raise the signal arm to a maximum in signalling operations.

Spring 26 on shaft 8 is of sufficient power to retract shaft 8, actuators A and elements C to normal positions when any solenoid D is deenergized. While contacts 22 and 22' are normally engaged and the main circuit is open no electrical result is occasioned thereby.

The contacts 22' on actuators A are insulated from their supporting arms 12 while contacts 22 on fingers 21 are electrically connected to ground through elements C and shaft 8. When control switch is open all contact sets 22—22' are closed thereby grounding all solenoid circuits. When, however, switch 31 is operated to close one of the signal circuits, or when the vehicle brake is applied, a corresponding solenoid will be energized and the associated actuator A will operate throughout its cycle and engage its contact 22' with contact 22 on the associated unit C. Such an operation rotates shaft 8 and the other units C are disengaged from their associated units A with their contact sets 22—22' thus open; also, the ground sides of the circuits on the two inoperative units will be open.

If, before one cycle of operation is completed, another selected operation is instituted by operating switch 31, the circuit on its grounded side will remain open until the previous operation is completed. But, as all three sets of contacts 22—22' become closed due to rotation of shaft 8 to non-signalling position, the previous operation will be completed and the next operation will automatically follow through to completion. It is notable that any operative actuating unit will follow and complete its complete cycle while the other inoperative units will remain open until their turn, regardless of its actuation during or after the completion of an operating cycle of another unit.

The vehicle brake, of course, effects the operation of the stop and slow signal means and frequently two of the solenoids may be simultaneously energized. For example, if an operator proposes to give either a right or left hand turning signal one of the two associated solenoids is energized and if in the meantime, it becomes necessary to slow down, through operation of the brake the slow and stop signal is instituted by the energization of its solenoid. In such event the first signal instituted will be maintained until all circuits are cleared, but upon completion of the first signal a second signal will immediately follow.

It is important to note in the consideration of this invention that while either or both vacuum and electrical devices may have heretofore been used in signalling apparatus no prior apparatus has been provided which uses electrical devices solely for effecting and controlling the application of vacuum to and as a sole means of operating the signal arm. Electrical energy is utilized for operating the controls through solenoids D and for operatively connecting the vacuum motor with a source of vacuum.

The essence of this invention, therefore, is in the above named characteristics broadly considered as well as in the specific elements and combinations necessary to provide an operative system free from unnecessary and complicated parts.

I claim:

1. A vehicle direction signal comprising: a housing attachable to the body of a vehicle, a vacuum motor having an operated element and borne by the housing and adapted for connection with a source of vacuum, a signal arm fixed to the operated element of said motor whereby said signal arm may be swung from neutral non-signalling position to a plurality of positions for affording different signals indicating proposed changes in the operation of a vehicle, a shaft in said housing, a plurality of control units each including an actuator loosely supported and rotatable on said shaft for independent rotation and a contact element adjacent each actuator and fixed to and for common rotation with said shaft, an electric circuit connected with the electrical system of the vehicle and including a multiple contact control switch, connections with the actuators and contact elements of said control units, and a solenoid operatively connected with each of said control units, whereby different operations of said control switch will simultaneously close the circuit of the corresponding solenoids and control units and activate said motor to effect the movement of the signal arm to selected signalling positions.

2. A vehicle direction signal as set forth in claim 1 including a plurality of normally retracted stops on said housing operatively connected with the actuators of said control units whereby upon the operation of said actuators corresponding stops will be thrust into position for arresting the swing of the signal arm at points corresponding to different signalling positions.

3. A vehicle direction signal as set forth in claim 1, an electric lamp borne by said signal arm and in circuit with said control units, a switch controlling the energization of said lamp, and a member borne by and rockable with said shaft for automatically closing said switch when said shaft is rocked on the institution of any signalling movement of the signal arm, and a mechanical connection between said switch closing member and said vacuum motor for activating said motor when said shaft is rocked.

4. A vehicle direction signal as set forth in claim 1 including a plurality of normally retracted stops on said housing operatively connected with the actuators of said control units whereby upon the operation of said actuators corresponding stops will be thrust into position for arresting the swing of the signal arm at points corresponding to different signalling positions, the connections between the actuators of the control units and said stops being arranged to effect operation of but one stop without operating another stop.

5. A vehicle direction signal as set forth in claim 1 in which the actuators and contact elements of each of said control units have contacts normally engaged for grounding the circuit and the actuators of said units having armatures disposed adjacent the cores of said solenoids, whereby upon the energization of any of said solenoids, all of the contact elements of said control units will be correspondingly actuated while only the actuator of a single unit will be actuated by its associated solenoid.

6. In a vehicle direction signalling apparatus, in combination with a signal arm and a vacuum motor for moving said arm to different signalling positions, a plurality of contact elements coaxially mounted for rotative movement together in a signalling operation, a corresponding number of actuators coaxially mounted relative to each other and paired with said contact elements but operable independently of each other and of said contact elements, a solenoid associated with and adapted to operate each actuator, said solenoids operatively connecting said actuators respectively with and for activating said motor in accordance with the operation of a particular actuator when a corresponding solenoid is energized.

7. A vehicle direction signal as set forth in claim 12, including an electric circuit connected with a source of energy and including said actuators, contact elements and solenoids and also including a plurality of signal contacts corresponding to proposed right and left hand turns and slowing or stopping of the vehicle, and a switch in said circuit operable simultaneously with the signal arm in all signalling operations for energizing said luminous signals appropriately in each signalling operation.

LEE TWIST.

References Cited in the file of this patent

UNITED STATES PATENTS

| Number | Name | Date |
|---|---|---|
| 1,478,571 | Ludquist | Dec. 25, 1923 |
| 1,687,183 | Smith et al. | Oct. 9, 1926 |
| 1,852,540 | Rush | Apr. 5, 1932 |
| 1,954,492 | Rosen | Apr. 10, 1934 |
| 2,122,508 | Bell | July 5, 1938 |
| 2,148,695 | Ishibashi | Feb. 28, 1939 |